J. D. SCHIERLOH.
FIRE NOZZLE ATTACHMENT FOR VALVES.
APPLICATION FILED JUNE 28, 1907.
899,330.
Patented Sept. 22, 1908.
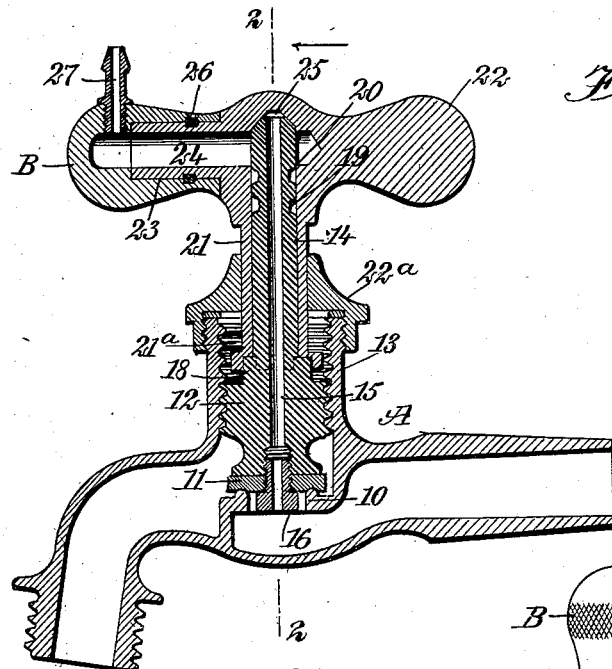
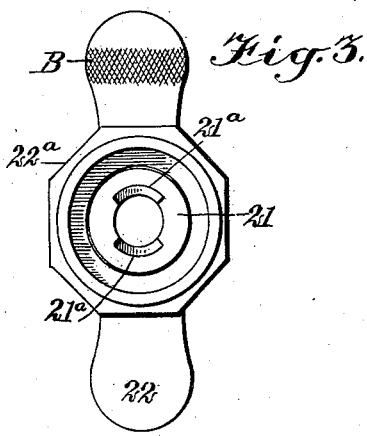
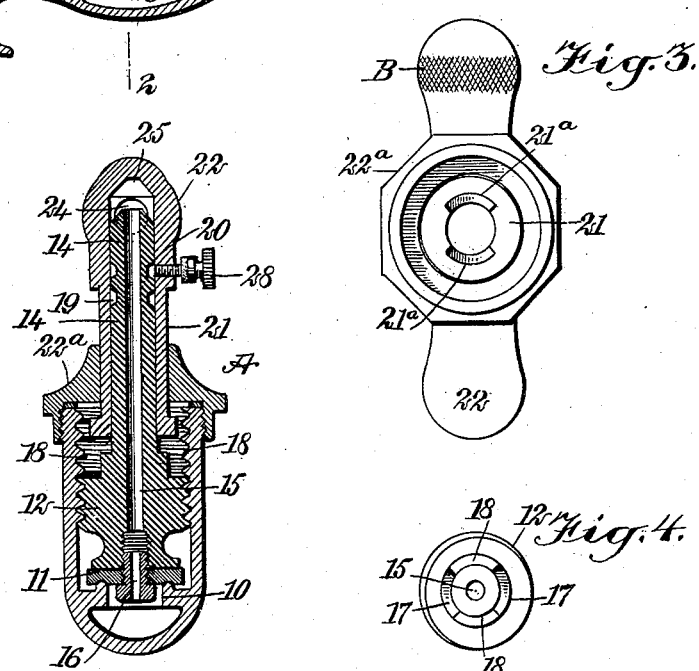
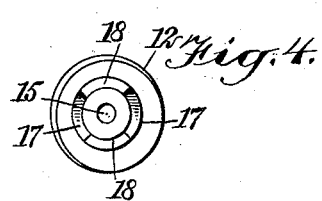
WITNESSES
INVENTOR
John D. Schierloh
BY
ATTORNEYS

UNITED STATES PATENT OFFICE.

JOHN D. SCHIERLOH, OF JERSEY CITY, NEW JERSEY.

FIRE-NOZZLE ATTACHMENT FOR VALVES.

No. 899,330.  Specification of Letters Patent.  Patented Sept. 22, 1908.

Application filed June 28, 1907. Serial No. 381,249.

To all whom it may concern:

Be it known that I, JOHN D. SCHIERLOH, a citizen of the United States, and a resident of Jersey City, in the county of Hudson and State of New Jersey, have invented a new and useful Improvement in Fire-Nozzle Attachments to Valves, of which the following is a full, clear, and exact description.

The purpose of the invention is to provide a faucet or valve with a nozzle at its handle portion, capable of being directed to practically all portions of a room or compartment in which the faucet or valve may be located, to facilitate the extinguishing of flames, and to provide a construction of faucet wherein by a single movement of the valve stem, water may be supplied to the said nozzle, or be cut off therefrom.

Another purpose of the invention is to provide a fire nozzle attachment for valves or faucets, which will in no manner interfere with its ordinary functions nor with the ordinary operation of the handle.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a vertical section through a faucet and attached nozzle, illustrating the position of the parts when the water is cut off therefrom; Fig. 2 is a section taken practically on the line 2—2 of Fig. 1, showing the position of the parts when the water is supplied to the nozzle; Fig. 3 is a bottom plan view of the valve stem casing and cap or bonnet for the valve chamber; and Fig. 4 is a plan view of the valve stem.

A represents the body of a faucet provided with the customary valve seat 10 adapted to receive a valve 11 of any approved type, the body 12 of which valve is exteriorly threaded to receive the interior thread of the valve chamber 13. The body 12 of the valve is provided with a stem 14, the said stem being tubular, and an opening 15 is made in the body of the valve corresponding to and connecting with the bore of the valve stem, as is shown in Figs. 1 and 2, and a nipple 16 employed to hold the valve to its body, is also provided with an opening or bore extending through from end to end, the opening in the said nipple and that in the body and stem of the valve, being continuous.

The valve stem 14 where it connects with the body 12 is provided with opposing segmental recesses 17, that form opposing segmental upwardly extending lugs 18, as is shown best in Fig. 4, and furthermore, the said valve stem 14 is provided adjacent its upper end with two annular grooves 19 and 20, and the upper end portion of the said valve stem is more or less inclined or rounded off so as to form practically a valve surface. The valve stem 14 is received in a casing 21, and the said casing 21 at its lower end is provided with opposing segmental recesses 21ª, that receive the lugs 18 on the valve stem when the two said parts are brought together, as is illustrated in Fig. 1, so that at such time the valve stem and its casing will turn together.

The valve stem casing 21 is provided with a bonnet or cap 22ª adapted to be exteriorly screwed upon the upper end of the valve chamber 13, and the said valve stem casing 21 is provided with a T-handle 22, one member of which handle is reduced in diameter, as is shown at 23 in Fig. 1, and this member of the said handle is also provided with a chamber 24, through which chamber the valve stem 14 extends, and the upper or valve portion of the said valve stem is received in a recess 25, produced at the central portion of the said handle 22, as is also shown in Fig. 1. The reduced portion 23 of the handle 22 is provided with a tubular member B, that is mounted to turn thereon, and the chamber of the tubular member B is in communication with the aforesaid chamber 24 in the handle, and the member B is provided with a packing 26 of any suitable or approved construction, whereby the member B may turn upon said handle and have a perfectly water-tight connection therewith.

The tubular member B is provided with a nozzle 27, either screwed therein or integral therewith, so that when water is supplied to the said nozzle 27 it can be directed to any point in the room wherever it may be needed, since the said member B may be turned upon the handle, and the handle and its accompanying valve stem casing 21 can be readily turned upon the valve stem when the valve stem casing is disconnected from the lugs 18 of the valve stem. The valve stem casing 21 is held either in engagement with the aforesaid lugs 18, or out of engagement therewith by means of a set screw 28, or its equivalent, that is passed through the valve stem casing 21, and is made to enter either of the annular grooves 19 or 20. When the set screw 28 is in the lower groove 19 the valve stem and its casing are held locked together, but when the set screw enters the upper groove 20, the valve stem casing is held in such position that it is disconnected from the valve stem and may freely turn thereon, and at such time the water passing out through the bore in the valve stem, will enter the chamber 24 in the handle of the valve stem casing, and pass therethrough to the nozzle 27, from whence it will escape.

A valve constructed as set forth is exceedingly serviceable where a fire occurs in a room, since the water can be quickly directed to the nozzle 27, and the nozzle directed to wherever the flame may be, thus providing for a supply of water at the danger point, while a further supply is being provided for.

It is not absolutely necessary that the valve stem casing shall be locked in its upper position, since the force of the water in the valve stem casing supplied thereto by a bore in the valve stem, will be sufficient to hold the said casing in its upper position and provide for an ample supply of water to the nozzle.

Having thus described my invention, I claim as new and desire to secure by Letters Patent,—

1. The combination with a valve casing, and a valve, of a handle for the valve, said valve and handle having a normally closed outlet therethrough, and means whereby the moving of the handle with respect to the valve will open and close the outlet.

2. The combination with the body of a valve, a tubular valve stem therefor, and a handle casing for the said valve stem, the said casing being capable of vertical movement, of a member revolubly mounted upon the said handle casing, a nozzle carried by said revoluble member, a communication between the body of the valve and the said nozzle, and means for opening such communication and for cutting off the same.

3. The combination with the body of a faucet, a valve, a tubular stem for the valve, a casing mounted to turn around the valve stem and to slide thereon, a chambered handle for the said casing, having a seat to receive the upper portion of the valve stem, and a locking connection between the valve stem and the casing, of a chambered member mounted to revolve around the chambered portion of the said handle, the two said chambers being capable of communication with the bore of the valve stem, a nozzle carried by the said chambered and revoluble member, and means for closing the communication between the chamber of the handle and the bore of the valve stem and for establishing said communication.

In testimony whereof I have signed my name to this specification in the presence of two subscribing witnesses.

JOHN D. SCHIERLOH.

Witnesses:
J. FRED ACKER,
GEO. FRASER.